(12) United States Patent   (10) Patent No.: US 7,756,860 B2
Hamilton, II et al.          (45) Date of Patent:    Jul. 13, 2010

(54) ADVANCED HANDLING OF MULTIPLE FORM FIELDS BASED ON RECENT BEHAVIOR

(75) Inventors: Rick Allen Hamilton, II, Charlottesville, VA (US); Brian Marshall O'Connell, Cary, NC (US); Keith Raymond Walker, Austin, TX (US); Andrew Ladd Wismar, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/752,401

(22) Filed: May 23, 2007

(65)        Prior Publication Data

US 2008/0294618 A1    Nov. 27, 2008

(51) Int. Cl.
G06F 7/00    (2006.01)
G06F 17/00   (2006.01)

(52) U.S. Cl. ................... 707/718; 707/721; 715/221; 715/234

(58) Field of Classification Search ............ 707/4, 707/3, 5; 715/221, 234, 705, 968
See application file for complete search history.

(56)        References Cited

U.S. PATENT DOCUMENTS

| 6,112,172 | A   | 8/2000  | True et al. | |
| 6,594,654 | B1* | 7/2003  | Salam et al. | 707/3 |
| 6,654,807 | B2  | 11/2003 | Farber et al. | |
| 6,826,624 | B1  | 11/2004 | Fell, Jr. | |
| 7,027,987 | B1  | 4/2006  | Franz et al. | |
| 7,287,214 | B1* | 10/2007 | Jenkins et al. | 715/205 |
| 2002/0143940 | A1 | 10/2002 | Chi et al. | |
| 2005/0160107 | A1* | 7/2005 | Liang | 707/100 |
| 2006/0195447 | A1 | 8/2006 | Chang | |
| 2007/0162422 | A1* | 7/2007 | Djabarov | 707/2 |

\* cited by examiner

*Primary Examiner*—Tony Mahmoudi
*Assistant Examiner*—MD. I Uddin
(74) *Attorney, Agent, or Firm*—Dillon & Yudell LLP

(57)        ABSTRACT

A method, system and computer program product for enhancing the usability of web browsers by analyzing the recent behavior of an operator while executing a search pattern on a computer network. In particular, a browser enhancement utility provides web browsers with the ability to store (for a limited time period) search terms used in a variety of web search patterns. The browser enhancement utility employs ranking algorithms to identify the relationships between searches and a ranking and matching algorithm to utilize stored search terms to find (text) matches in a web document. When the browser displays web pages after a search has occurred, the browser enhancement utility utilizes these matches in order to take actions to enhance document usability. These actions include: Highlighting terms that have been recently searched for; pre-selecting matching terms from drop down boxes or radio buttons; and focusing a web page to relevant sections of text.

20 Claims, 7 Drawing Sheets

ADVANCED HANDLING OF MULTIPLE FORM FIELDS BASED ON RECENT BEHAVIOR

RELATED APPLICATION

The present invention is related to the subject matter of U.S. application Ser. No. 11/752/406, filed concurrently herewith. The content of the related application is incorporated herein by reference.

BACKGROUND OF THE INVENTION

1. Technical Field

The present invention generally relates to web browser software and in particular to the search results of web browsers. Still more particularly, the present invention relates to the processing of user inputs and search results of web browsers.

2. Description of the Related Art

Internet based search systems facilitate a user's ability to efficiently navigate through countless pages of information on the World Wide Web (the "Web") in order to locate a desired website or set of websites. The Web runs on the Internet, which is the world's largest computer network. A web browser is a software application that enables a user to display and interact with text, images, and other information typically located on a web page of a website on the Web or on a local area network (LAN). In the web environment, web browsers are clients and web documents reside on (web) servers. A web browser opens a connection to a server in order to initiate a request for a document. Web browsers communicate with web servers primarily using the hypertext transfer protocol (HTTP) to submit information to web servers as well as fetch web pages from web servers. Following the server's delivery of a requested document, the web browser formats hyper-text markup language (HTML) information in order to display web pages. Text and images on a web page may contain hyperlinks to other web pages at the same website or at a different website. Each hypertext link is associated with a Universal Resource Locator (URL) which specifies a server and a particular document on the server. Web browsers allow a user to efficiently access information provided on many web pages at many websites by traversing these hypertext links.

Search engines are the key to finding specific information on the vast expanse of the World Wide Web. Servers may provide a mechanism for searching a collection of documents by supplying a form (for the entry of search terms) which is displayed at the web browser.

One common usage pattern of a web browser comprises the following steps: (1) A user performs a search for a term or set of terms. The search may be either an internet search engine query, an in-document find, or a site based search, as is commonly found on internet forums; (2) Based on the results of the search, the user performs a plurality of tasks such as opening new browser windows, opening new tabs, (selecting and) following links, etc; and (3) The user looks for the terms that were initially searched for in the aforementioned browser windows, tabs and linked pages.

This usage pattern, which may be termed "search and follow," may be repeated multiple times during a single browser session. A single "search and follow" usage pattern may spawn other "search and follow" patterns related to the first pattern. Another aspect of the "search and follow" pattern is that the latest search is typically most relevant to the user's current thread of activity. Finally, searches and their related threads of activity often crisscross between unrelated web sites. Even though this pattern is widely adopted by users, current web browsers do not capitalize on this pattern to increase the usability of an operator's experience.

Some web browsers attempt to increase document usability by enabling the ability to remember previous entries into HTML forms. However, these remembered fields are restricted to text input fields only, and are often restricted on a "per-site" basis, where a user's name (for example) is remembered for siteA.com, but has to be entered manually on siteB.com. Additionally, these remembered fields are often stored in perpetuity, and over time become inaccurate.

SUMMARY OF THE INVENTION

Disclosed is a method, system and computer program product for enhancing the usability of web browsers by analyzing the recent behavior of an operator while executing a search pattern on a computer network. In particular, a browser enhancement utility creates a better user experience by improving page navigation and automatically enhancing document usability. The browser enhancement utility provides web browsers with the ability to store (for a limited time period) search terms used in a variety of web search patterns. The browser enhancement utility employs a set of ranking algorithms to identify the relationships between searches and another ranking and matching algorithm to utilize stored search terms to find (text) matches in a web document. When the browser displays web pages after a search has occurred, the browser enhancement utility utilizes these matches in order to take actions to enhance document usability.

These actions include: highlighting the search keywords and terms (in the document text) that match the search terms that have been recently searched to allow a user to rapidly locate sections of interest; pre-selecting (default) matching terms from drop down boxes or radio buttons; and (auto) focusing a web page to relevant sections of text. The highlighting of terms, the pre-selection of matching terms from the drop down boxes or radio buttons, as well as the auto focusing of sections of text are influenced by the distance in time from an original search and related operator search. These actions may also be responsive to multiple browser instances (that is, searches from other tabs, browser windows, and even alternate browsers). The browser enhancement utility capitalizes on the fact that previous user behavior and inputs closely related in time are frequently relevant to the currently rendered page.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
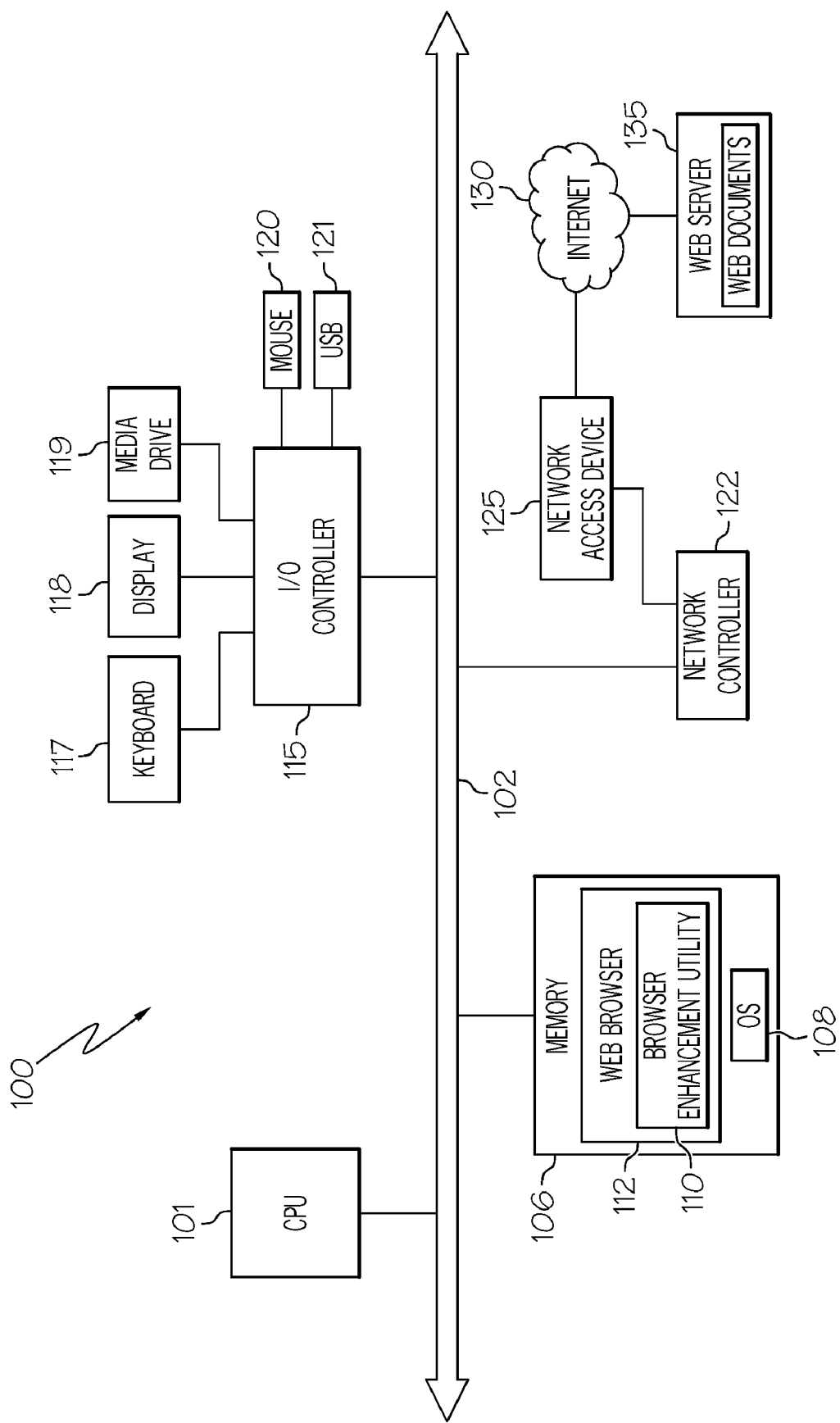
FIG. 1 illustrates a block diagram of a data processing system within which features of the invention may be advantageously implemented.

The present invention provides a method, system and computer program product for enhancing the usability of web browsers by analyzing the recent behavior of an operator while executing a search pattern on a computer network. In particular, a browser enhancement utility provides web browsers with the ability to store (for a limited time period) search terms used in a variety of web search patterns. The browser enhancement utility employs ranking algorithms to identify the relationships between searches and a ranking and matching algorithm to utilize stored search terms to find (text) matches in a web document. When the browser displays web pages after a search has occurred, the browser enhancement utility utilizes these matches in order to take actions to enhance document usability. These actions include: highlighting terms that have been recently searched for; pre-selecting matching terms from drop down boxes or radio buttons; and (auto) focusing a web page to relevant sections of text.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

With reference now to the figures, FIG. 1 illustrates a data processing system within which features of the invention may be advantageously implemented. Data processing system (DPS) 100 comprises a central processing unit (CPU) 101 coupled to a memory 106 via a system bus/interconnect 102. Also coupled to system bus 102 is an input/output controller (I/O Controller) 115, which controls access by several input devices, of which mouse 120 and keyboard 117 are illustrated. I/O Controller 115 also controls access to output devices, of which display 118 is illustrated. In order to support use of removable storage media, I/O Controller 115 may further support one or more USB ports 121 and media drive 119 (e.g., compact disk Read/Write (CDRW)/digital video disk (DVD) drive).

DPS 100 further comprises network interface device (NID) 125 by which DPS 100 is able to connect to and communicate with an external device or network (such as the Internet and/or a local area network (LAN)). As shown, DPS 100 connects to web server 135 via Internet 130. NID 125 may be a modem or network adapter and may also be a wireless transceiver device. Controlling access to NID 125 is Network Controller 122.

Those of ordinary skill in the art will appreciate that the hardware depicted in FIG. 1 may vary. For example, other peripheral devices may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software code stored within memory 106 or other storage and executed by CPU 101. Among the software code are code for enabling network connection and communication via NID 125, and more specific to the invention, code for enabling the browser enhancing features described below. For simplicity, the collective body of code that enables the web browser enhancing features is referred to herein as the browser enhancement utility. The browser enhancement utility may be integrated into current web browsers (providing a single packaged product) to provide the browser enhancing features. Alternatively, the browser enhancement utility may be a separate utility from the web browser and may be provided as an add-on, plug-in, or extension to an existing web browser. The browser enhancement utility also may be added to existing operating system (OS) code to provide the browser enhancing functionality described below.

Thus, as shown by FIG. 1, in addition to the above described hardware components, data processing system 100 further comprises a number of software components, including operating system (OS) 108 (e.g., Microsoft Windows®, a trademark of Microsoft Corp, or GNU®/Linux®, registered trademarks of the Free Software Foundation and The Linux Mark Institute) and one or more software applications, including web browser 112 (for example, Internet Explorer®) and browser enhancement utility 110. In implementation, OS 108, browser 112 and browser enhancement utility 110 are located within memory 106 and executed on CPU 101. According to the illustrative embodiment, when processor 101 executes browser 112 and browser enhancement utility 110, browser enhancement utility 110 enables data processing system 100 to complete a series of functional processes, including: (1) enhancing the ability of a browser to temporarily store the search terms used in a variety of web search mechanisms; (2) employing ranking algorithms to identify relationships between searches; (3) highlighting recently searched terms in a web document; (4) focusing a web page to relevant sections of text; and other features/functionality described below and illustrated by FIGS. 2-7.

In DPS 100, browser enhancement utility 110 executes to provide a computer implemented method for improving the usability of web browsers and other related software interfaces. The advancements enhance and accelerate the web browsing experience. The browser enhancements create a better user experience by improving page navigation and automatically enhancing document usability. It should be noted that browser enhancement utility 110 would likewise be useful for any medium (i.e., in other search areas other than over the Internet) that consists of searches and subsequent related navigations within the returned search results.

Browser enhancement utility 110 provides several changes to web browser capabilities. The web browser is modified to store the search terms used in a variety of web search mechanisms for a limited time period. When the browser displays pages after a search has occurred, the browser takes several actions to enhance usability. These actions (and associated advantages) include: (1) highlighting terms that have been recently searched for, allowing a user to rapidly locate sections of interest; (2) enabling the selection of (default) matching terms from drop down boxes or radio buttons; (3) pre-selecting (default) matching terms from drop down boxes or radio buttons; and (4) (auto) focusing a web page to relevant sections of text. The highlighting, the pre-selection of terms, as well as the auto focusing of sections of text are influenced by the distance in time from an original operator search. In one embodiment, these features may be responsive to multiple browser instances (e.g., searches from other tabs, browser windows, and even alternate browsers).

Figure 2:
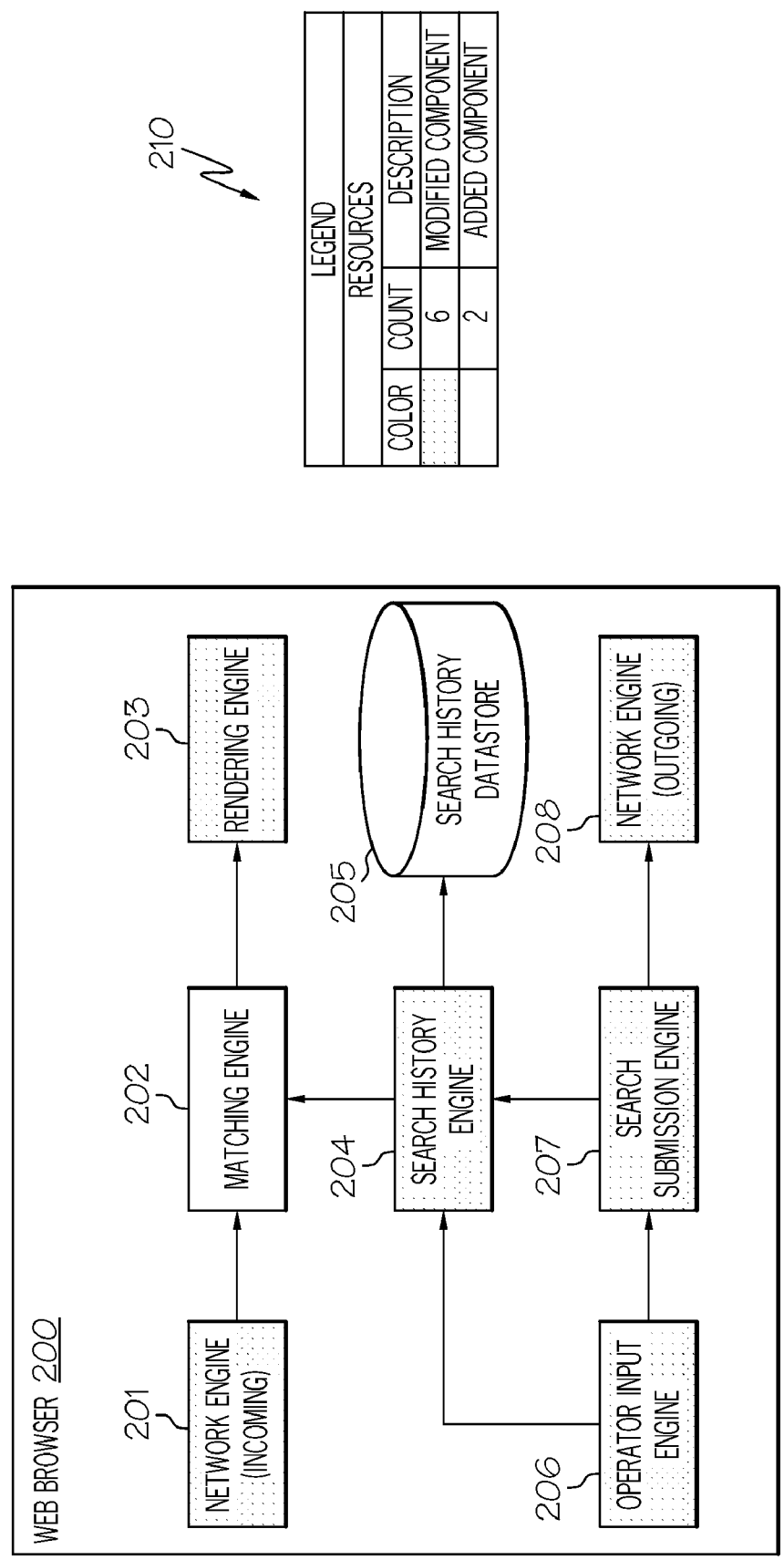
FIG. 2 illustrates a web browser architecture according to an illustrative embodiment of the present invention.

FIG. 2 illustrates the architecture of a web browser enhanced with the components of browser enhancement utility 110 and the interoperability of components of the web browser, according to an illustrative embodiment of the present invention. Web browser 200 comprises (Browser) Incoming Network Engine 201 which sends web objects to Matching Engine 202 for inspection. Matching Engine 202 is further connected to Rendering Engine 203 which converts web objects into a form suitable for display. Search History Engine 204 connects to Matching Engine 202 and also to Search History Datastore 205 in Web browser 200. Web browser 200 also comprises Operator Input Engine 206 which is connected to Search History Engine 204. Operator Input Engine 206 is also connected to Search Submission Engine 207, which determines if an operation (entered by a user) constitutes a search. Search Submission Engine 207 is further connected to Search History Engine 204 and to (Outgoing) Network Engine 208. Finally, Web browser 200 is accompanied by Legend 210, which facilitates the description of the enhancements to browser 200.

As illustrated by Legend 210, Matching Engine 202 and Search History Datastore 205 in web browser 200 are new components added to the architecture of a conventional web browser to enable the functional features of browser enhancement utility 110. Legend 210 also illustrates that the "modified" components, namely, Incoming Network Engine 201, Rendering Engine 203, Search History Engine 204, Operator Input Engine 206, Search Submission Engine 207, and Network Engine Outgoing 208 are all modifications of components that are normally present (without the modifications) in conventional web browsers. However, these components are modified herein to provide the browser enhancing features of the present invention.

In web browser 200, Incoming Network Engine 201 performs the network transactions for the browser. Network transactions include: fetching web objects; submission of form data; connection time-outs; and other network functions, as required for adherence to RFC 2616 standard for HTTP/1.1 compliant web browsers. Incoming Network Engine 201 is modified to pass downloaded web objects to matching engine 202 for inspection. Additionally, outgoing network engine 208 (a modification of incoming network engine 201) accepts input from search submission engine 207 for outgoing network transactions.

Matching Engine 202 receives web objects from Incoming Network Engine 201 and performs the following functions: web object inspection; web object search, which is executed by searching the content of textual web object for character combinations; and metadata generation for the transfer of metadata with the web object to rendering engine 203. The metadata includes instructions describing the transformations rendering engine 203 makes to the web object.

Web object inspection involves/requires Matching Engine 202 inspecting every web object fetched by incoming network engine 201 to determine if the object is textual. A variety of methods may be used to make the determination. A non-exhaustive exemplary list includes: examining the objects mime type; inspecting the file extension of the object; and inspecting the data of the object, looking for characteristics of textual documents. If the object is textual, the web object search procedure of Matching Engine 202 is invoked. Otherwise the object is passed to rendering engine 203 for display.

Web Object Search involves/requires Matching Engine 202 querying search history engine 204 to retrieve a ranked list of recently inputted character combinations used in a recent/previous search. The textual object is then inspected and each white-space delimited character combination is ranked (based on a match) in both the displayable text and the selectable text in drop down boxes and/or radio buttons. For each successful match (item), a metadata entry is created, noting the location, item type (displayable text, drop down text option, radio button text option), and rank of each match item. These metadata entries along with the original web object are then transferred to rendering engine 203.

In order to determine rank, Matching Engine 202 employs a ranking algorithm (also referred to as a matching algorithm). In one embodiment, the matching algorithm provides the following functional steps:

(1) taking the highest remaining ranked item (indicated by the item with the lowest (rank) number) from the search history engine;

(2) multiplying the rank for the item by a constant to create separation between ranks that results in favoring more recently entered terms. Items from the same web object are multiplied by the same constant, whereas items from different web objects undergo multiplication by different constants;

(3) For every white-space delimited character combination, computing the closeness of the combination to the item taken from the history data store. The closeness calculation must return an integer indicating the string proximity of the two character combinations. Several known algorithms are capable of this computation, such as the Levenshtein distance algorithm. The Levenshtein distance between two strings is given by the minimum number of operations needed to transform one string into the other, where an operation is an insertion, a deletion, or a substitution of a single character;

(4) Discarding entries whose closeness calculation exceeds a (preset) threshold percentage of the number of letters in the search term;

(5) Adding the closeness calculation to the multiplied rank;

(6) Inserting newly computed rank into an ordered data structure such as a Min Heap (i.e., a tree-based data structure in which the smallest element (for example, a ranking) is always in the root node); and (7) Repeating/Iterating through the sequence (of algorithm steps) until all search items are selected from search history engine 204.

The result of the ranking algorithm is a Min Heap, which contains a ranking for every white-space delimited character combination in the textual web object.

Matching Engine 202 generates three types of metadata for textual web objects. A first type of metadata is a radio and drop-down pre-select. The elements of all radio and drop down objects are inspected for pre-selection. Every white-space delimited character combination (from the elements of radio and drop down objects) is compared (using the matching algorithm) to the items returned by search history engine 204. A best match (highest ranked item) is pre-selected from the ranked list of matches returned by the matching algorithm. In one embodiment, a minimum match threshold is pre-set/pre-established, and any match that is ultimately pre-selected is required to match at or above the threshold (e.g., 70% match threshold). With this embodiment, even the best match may not meet the minimum threshold criteria, and consequently no results will be pre-selected, regardless of the input types of web objects.

A second type of metadata is highlighting. Again, every white-space delimited character combination (i.e., each term) in the textual web object is compared to the items/terms returned by search history engine 204. Metadata indicating which white-space delimited character combinations are to be highlighted is generated by selecting the best matches from a ranked list of matches returned by the matching algorithm (assuming that the matches meet the minimum match threshold). Multiple metadata entries may be created for one textual web object. Each metadata entry may provide instructions for each term of the web object, or may alternatively provide instructions for a multiple of white-space delimited character combinations. In addition, metadata entries also provide rank information for each white-space delimited character combination, which is used by rendering engine 203 to provide a corresponding degree of highlighting impact.

A third type of metadata supported by the invention is that which provides Auto-Focus. Metadata may be generated to request rendering engine 203 automatically focus on one section of text if the following characteristics are met: (a) The matching algorithm finds a match for the highest ranked item from search history engine 204; and (b) The match occurred from the most recent entry in the current "search and follow" pattern thread. In instances where one or more combinations match the requirements for auto-focus, the first such entry is auto-focused, in one embodiment.

Returning to FIG. 2, rendering engine 203 receives web objects from matching engine 202 and converts these web objects into a visual object suitable for display inside the browser window. Rendering Engine 203 is modified to interpret the metadata supplied by matching engine 202 and transforms the rendering of the web object appropriately and in accordance with any user preferences. Because Rendering Engine 203 is responsible for display, certain browser enhancements/transformations are observed by the user as a result of the (metadata) instructions received by Rendering Engine 203. Among the browser enhancements are the radio and drop-down pre-selection. The metadata that accompanies each textual web object contains instructions for each set of radio or drop-down elements within that web object to instruct the rendering engine which item to pre-select. Thus, this embodiment provides a departure from conventional techniques where either the first item or no items are pre-selected. Conventional form filling software is capable of filling out forms based on stored user profiles. Generally such software is able to fill out text fields, select elements from drop-down boxes, and select radio buttons based on stored user profile information. However, conventional form filling technology does not take advantage of the "search and follow" usage pattern, nor uses a temporal component when filling out forms.

The next browser enhancement is highlighting. The metadata for each textual web object contains instructions to highlight character combinations. Included in this metadata are rankings. Rendering Engine 203 assigns a background or highlight color to each ranking. Embodiments may independently choose color schemes to fit the application; however highly ranked items appear visually "bolder" than lower ranked items, in one embodiment. Thus, higher ranked items are highlighted to provide a greater visual impact (i.e., a greater relative level of conspicuousness) or to draw the attention of the average user when compared to lower ranked items. Thus, this embodiment provides a departure from conventional techniques where no text is automatically highlighted or if a user performed a search and subsequently navigated through several intermediate pages, the terms would not be highlighted after the first page.

A third browser enhancement is Auto-Focusing. In certain mixtures of user actions and search history engine rankings, matching engine 202 may provide metadata to indicate to rendering engine 203 that rendering engine 203 automatically focuses on a section of text. Auto-focusing entails that rendering engine 203 executes a "scrolling" to a section of the textual web object in order to vertically and/or horizontally center that section of text on the display. In one embodiment, this feature is only implemented by rendering engine 203 when rendering engine 203 is unable to render the entire textual web object on the visible screen. Thus, this embodiment provides a departure from conventional techniques where there is no particular focusing/centering of any section of text.

Search History Engine 204 is responsible for the storage of significant user search terms and the expiration of those terms based on a pre-established time interval. User's search terms are stored across page requests until Search History Datastore 205 determines the terms have aged too long, and the terms are removed. Thus, Search History Engine 204 is responsible for the expiration system which runs periodically, or on demand, and which expires old entries from the data store sub-component. The expiration time may be pre-set by a user/administrator. Data store 205 stores the time an entry is placed into Data store 205 and that stored time is used to calculate the expiration time for that entry.

In one embodiment, threading and branching information is maintained by search history engine 204 to track the relationship between searches as well as the "search and follow" pattern employed by the browser's operator. The threading and branching information is derived from operator input engine 206.

Additionally, Search History Engine 204 provides a ranking of search history items influenced by which "search and follow" thread is requesting this list. In selecting the user search terms for storage, Search History Engine 204 uses current/known technology to only store significant (i.e., remove insignificant) search terms in Search History Datastore 205. A non-exhaustive list of insignificant terms includes: and, the, or, where, and how. Words that are judged insignificant are discarded.

Search history engine 204 assigns rankings to web objects. The assigned/generated rankings are influenced by the relationship of the requesting browser "thread" to the previous "search and follow" patterns stored by search history engine 204. Two ranking algorithms, ranking algorithm 1 and ranking algorithm 2, are used. The first ranking algorithm is used if the requesting thread may be associated with a "search and follow" pattern thread. The second ranking algorithm is used in cases where there is no association with a "search and follow" pattern thread.

Browser enhancement utility 110 utilizes ranking algorithm 1 when a requesting thread is associated with a "search and follow" pattern thread. The matching algorithm performs the following steps: (1) the entire search phrase from the most recent search is assigned a ranking of "1"; (2) White-space delimited character combinations from the most recent search are assigned a ranking of "2"; (3) For each previous search within the same "search and follow" pattern, increment the ranking for search terms by one for each step backwards by following steps 1 and 2 above; and (4) For terms not backwards reachable, ranking each search starting at the most recent search, then incrementing ranking by one for all prior searches not already ranked.

Browser enhancement utility 110 utilizes ranking algorithm 2 when a requesting thread may not be associated with a "search and follow" pattern thread. The matching algorithm ranks each search starting at the most recent search, incrementing the ranking by 1 for all prior searches not already ranked.

In web browser 200, Datastore 205 is responsible for the storage of all information required by search history engine 204. Embodiments may choose between volatile and non-volatile storage mechanisms. Datastore 205 is capable of storing the terms, time-stamping the terms and storing the threading and branching history as required by search history engine 204. Additionally, Datastore 205 allows the expiration component of search history engine 204 to remove stale entries.

In web browser 200, Operator Input Engine 206 inspects and reacts to all user input including mouse and keyboard input. Operator Input Engine 206 provides the several enhancements, including: (1) notifying search history engine 204 whenever a new "search and follow" branching operation occurs. Several operations qualify as branching operations, including opening a link in a new window, opening a link in a new tab, clicking/following a link that opens in a new tab or new window; and (2) passing an operation and data pertaining to a user operation that may possibly result in a search to search submission engine 207 to determine if the operation in question constitutes a search.

Search submission engine 207 inspects operations passed from operator input engine 206 to determine if that operation constitutes a search. If that operation constitutes a search, search engine history 204 is notified. A non-exhaustive list operations or inputs that may result in or signal a search includes: (1) receiving the input from the browser's search bar; (2) receiving the input within a form submission on known search sites such as Google®, Altavista, Live.com, Yahoo®, etc.; (3) detecting that the value for the submit button contains the text "search"; and (4) detecting that the title of the input for the submitted form contains the text "search".

Figure 3:
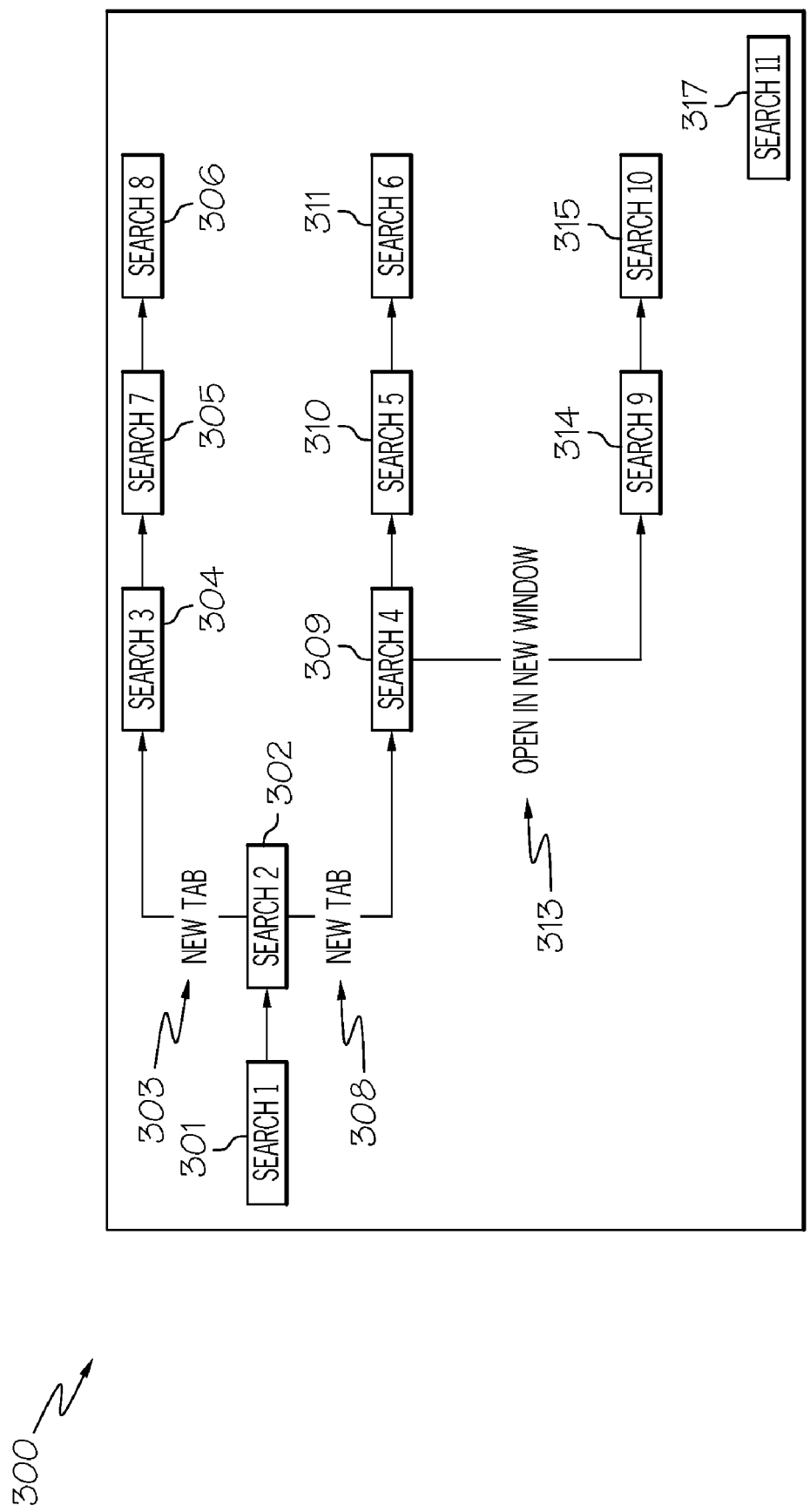
FIG. 3 illustrates an example of the relationships stored by the search history engine, according to an illustrative embodiment of the present invention.

FIG. 3 illustrates an example of the relationships stored by the search engine history according to an illustrative embodiment of the present invention. Search Patterns 300 comprises Search 1 301, Search 2 302, New Tab 1 303, Search 3 304, Search 7 305, and Search 8 306 which constitute the first branch. Search Patterns 300 also comprises New Tab 2 308, Search 4 309, Search 5 310, and Search 6 311 which (along with Search 1 301 and Search 2 302) constitute the second branch. Additionally, Search Patterns 300 comprises New Window 313, Search 9 314 and Search 10 315, which (along with previous search steps going back to Search 1 301) constitute the third branch. Finally, Search Patterns 300 also comprises independent Search 11 317.

Search Patterns 300 may be used to illustrate several cases/examples. In a first example, the browser thread has just completed "Search 8" and queries the search history engine to rank search terms. In this example, Search 11 has not yet occurred. Based on ranking algorithm 1, the following ranking is returned: (1) Search 8 terms; (2) Search 7 terms; (3) Search 3 terms; (4) Search 2 terms; (5) Search 1 terms; (6) Search 10 terms; (7) Search 9 terms; (8) Search 6 terms; (9) Search 5 terms; and (10) Search 4 terms.

The above set of rankings may be explained as follows: Search 8 is the requesting thread, and thus Search 8 terms are assigned a rank of 1. Stepping backwards from Search 8, ultimately leads back to Search 1. Thus, along the path from Search 8 to Search 1, the ranking algorithm assigns a ranking of 2 for Search 7, 3 for Search 3, 4 for Search 2 and 5 for Search 1. Step 4 of ranking algorithm 1 determines the next rank. Since all remaining (unranked) searches were not reachable by stepping backwards from Search 8, the algorithm indicates that search 10, the most recent remaining search, is assigned the next rank, which is a ranking of 6. Being one step backwards, Search 9 is assigned a rank of 7. The fact that the browser was opened in a new window indicates that Search 9 is the earliest associated "search and follow" pattern for the Search 10 thread. Search 6 is the most recent remaining search thread and is next assigned a rank of 8. Stepping backwards next leads to search 5 which is assigned a rank of 9. Finally, Search 4 is assigned a rank of 10. All searches are ranked completing the ranking of all Searches within Search History engine 304.

In the second example illustrated with Search Patterns 300, a new browser window opened prior to search 11 queries the search-history engine to rank search terms. In the second example, Search 11 has not yet occurred. Based on ranking algorithm 2, the following ranking is returned: (1) Search 10 terms; (2) Search 9 terms; (3) Search 8 terms; (4) Search 7 terms; (5) Search 6 terms; (6) Search 5 terms; (7) Search 4 terms; (8) Search 3 terms; (9) Search 2 terms; and (10) Search 1 terms.

The above set of rankings may be explained as follows: Since a new browser window was opened prior to the search history engine query, no search is backwards reachable from that point (the new browser window) and the requesting thread is not associated with any search and follow pattern. Thus, ranking algorithm 2 is employed to assign all rankings. As observed, the ranks are assigned by relative temporal search order. Thus, Search 10 is assigned the highest (lowest number) rank while Search 1 is assigned the lowest (highest number) rank.

Figure 4:
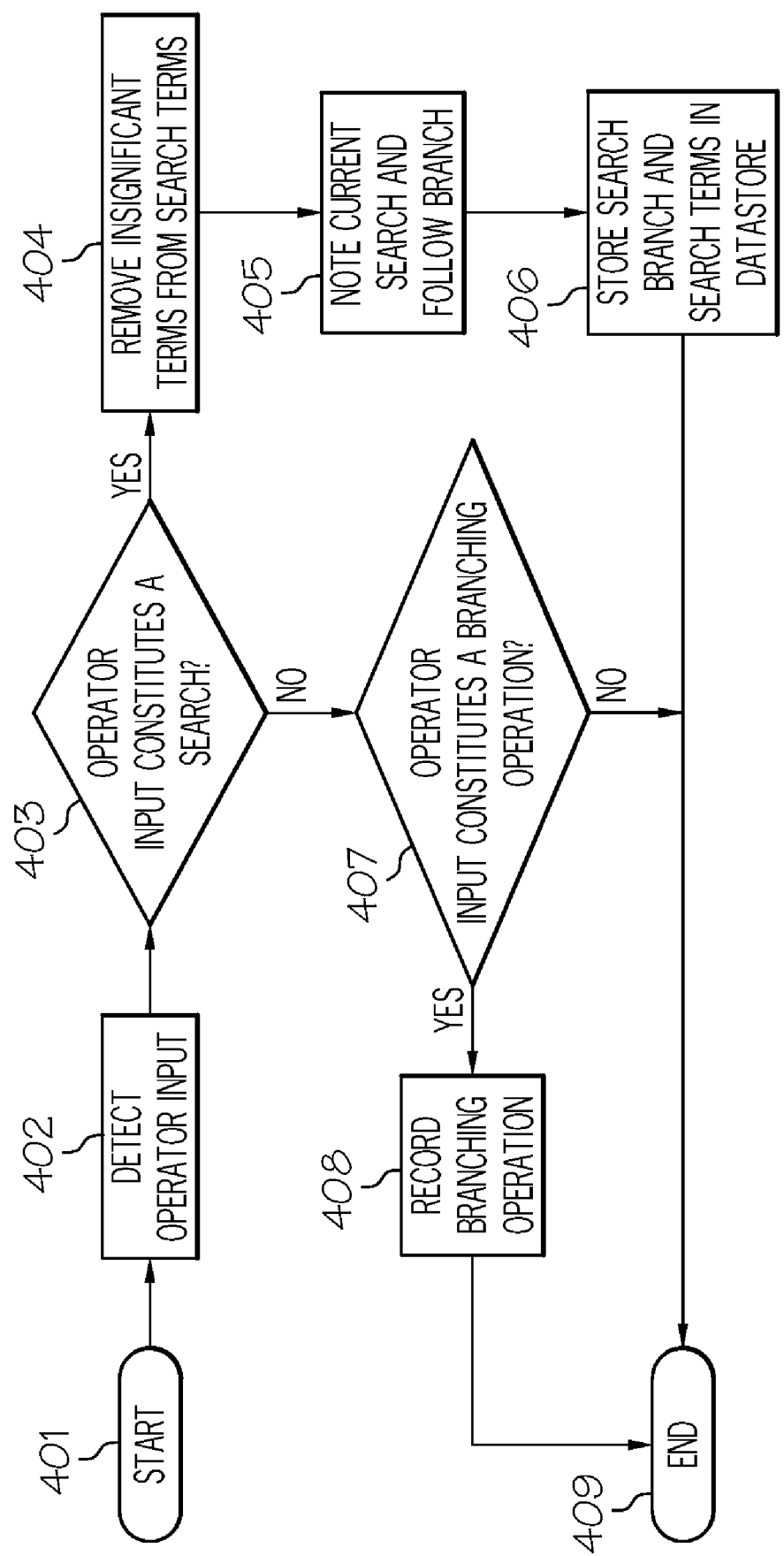
FIG. 4 is a flow chart which illustrates the process completed by the browser (enhancement) utility when inspecting the operator input, according to an illustrative embodiment of the present invention.

FIG. 4 illustrates the process completed by the browser (enhancement) utility when inspecting a user's input, according to an illustrative embodiment of the present invention. The process begins at block 401 then moves to block 402, at which, an operator input is detected. Browser enhancement utility 110 then determines whether the user/operator input constitutes a search (as defined by the search submission engine 207 of FIG. 2) at block 403. If the operator input constitutes a search, the insignificant terms are removed from the search entry at block 404. Insignificant terms include words such as but, or, and, and the like. If the operator input does not constitute a search, the process moves to block 407, at which, browser enhancement utility 110 determines whether the operator input constitutes a branching operation as defined by operator input engine 206 (FIG. 2). If browser enhancement utility 110 determines, at block 407, that the operator input does constitute a branching operation, then the branching operation is recorded with/by search history engine 204 (FIG. 2), at block 408. However, if browser enhancement utility 110 determines, at block 407, that the operator input does not constitute a branching operation, the process ends at block 409.

Following the removal (at block 404) of insignificant terms from the search entry, browser utility/search history engine reviews, at block 405, the threading and branching information to identify the "search and follow" branch of which the current search is a part. The significant terms of the search entry and the identification of the "search and follow" branch are stored inside search history datastore 205, at block 406. The process ends at block 409.

Figure 5:
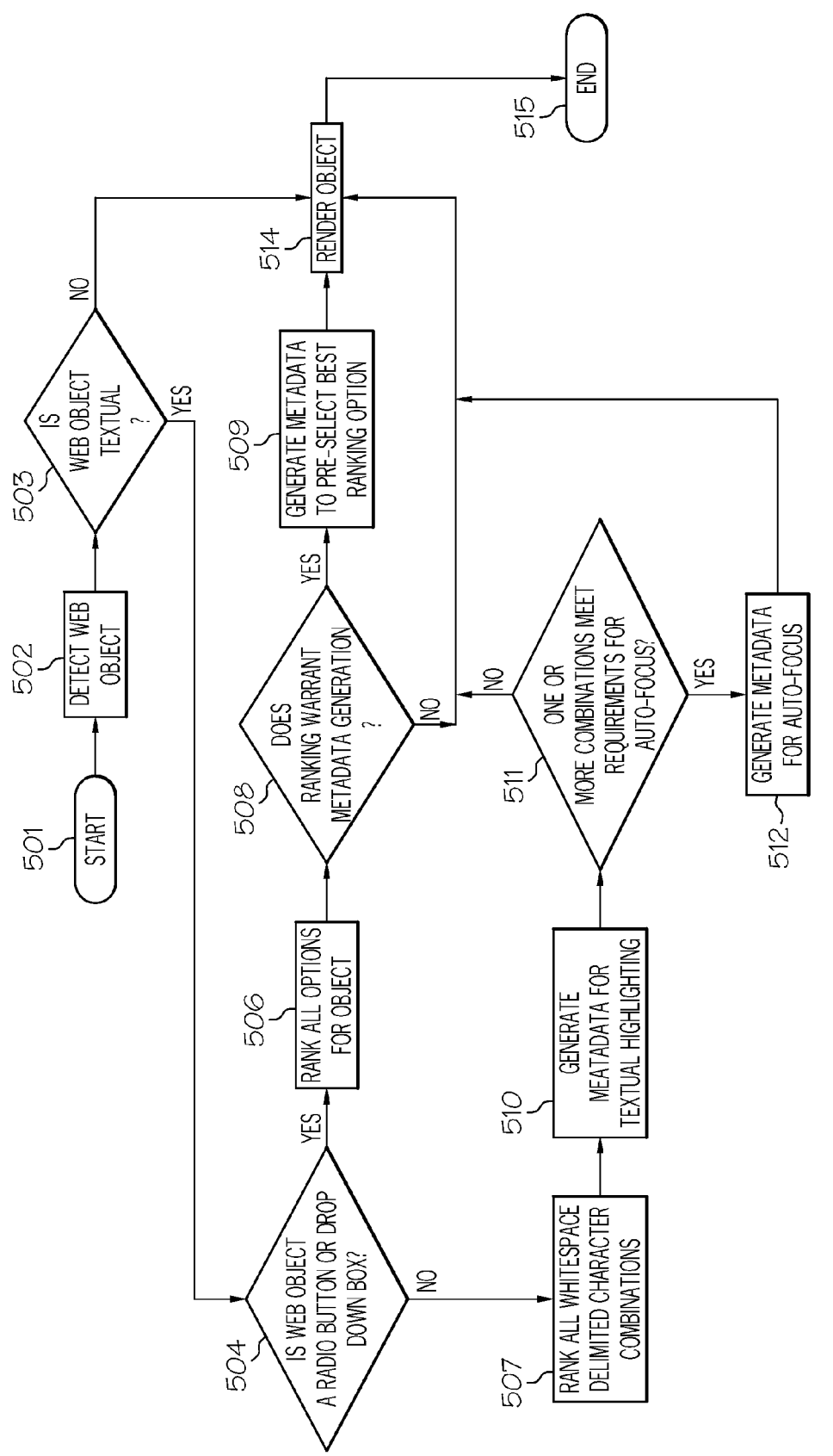
FIG. 5 is a flow chart which illustrates the process completed by the browser (enhancement) utility when rendering a web page, according to an illustrative embodiment of the present invention.

FIG. 5 illustrates the process completed by the browser (enhancement) utility when rendering a web page, according to an illustrative embodiment of the present invention. The process begins at block 501 then moves to block 502, at which, incoming browser engine 201 detects a web object and notifies matching engine of the incoming web object. At block 503, browser enhancement utility 110 determines if the web object is textual in nature. If the web object is textual in nature, further web object analysis is initiated at block 504, at which, browser enhancement utility 110 determines if part of the textual web object, currently under inspection, is within a list of radio buttons or within a list of a drop down box. If the web object is not textual, object rendering is performed as shown at block 514. If the textual web object is either within a radio button or a drop down box, the process moves to block 506, at which, all options (radio button or text box) are ranked for either the radio button group or the drop down box using the matching engine's algorithms.

Based on the ranking assigned at block 506, browser enhancement utility 110 determines if the ranking warrants the generation of metadata, at block 508. If browser enhancement utility 110 determines that the ranking warrants the generation of metadata, the process moves to block 509, at which metadata is generated to pre-select the best ranking option from the drop down box or radio button. The process then moves to block 514, at which, object rendering occurs. If browser enhancement utility 110 determines that the ranking does not warrant the generation of metadata, the process moves directly to block 514.

If the textual web object is neither a radio button nor a drop down box, the process moves to block 507, at which, all white-space delimited character combinations in the textual object are ranked using the matching engine and the search history engine. Following block 507, the process moves to block 510, at which metadata is generated for highlighting highly ranked text. Browser enhancement utility 110 determines, at block 511 whether one or more of the white-space delimited character combinations meet the requirements as described by the matching engine system for auto focusing. If the requirements for auto focusing are met, metadata is generated at block 512, which metadata instructs the rendering engine to auto-focus on a section of the web object is generated. Following block 512, the process moves to block 514. If the requirements for auto focusing are not met, as determined at block 511, the process moves directly to block 514. Following the rendering of the object at block 514, the process ends at block 515.

Figure 6:
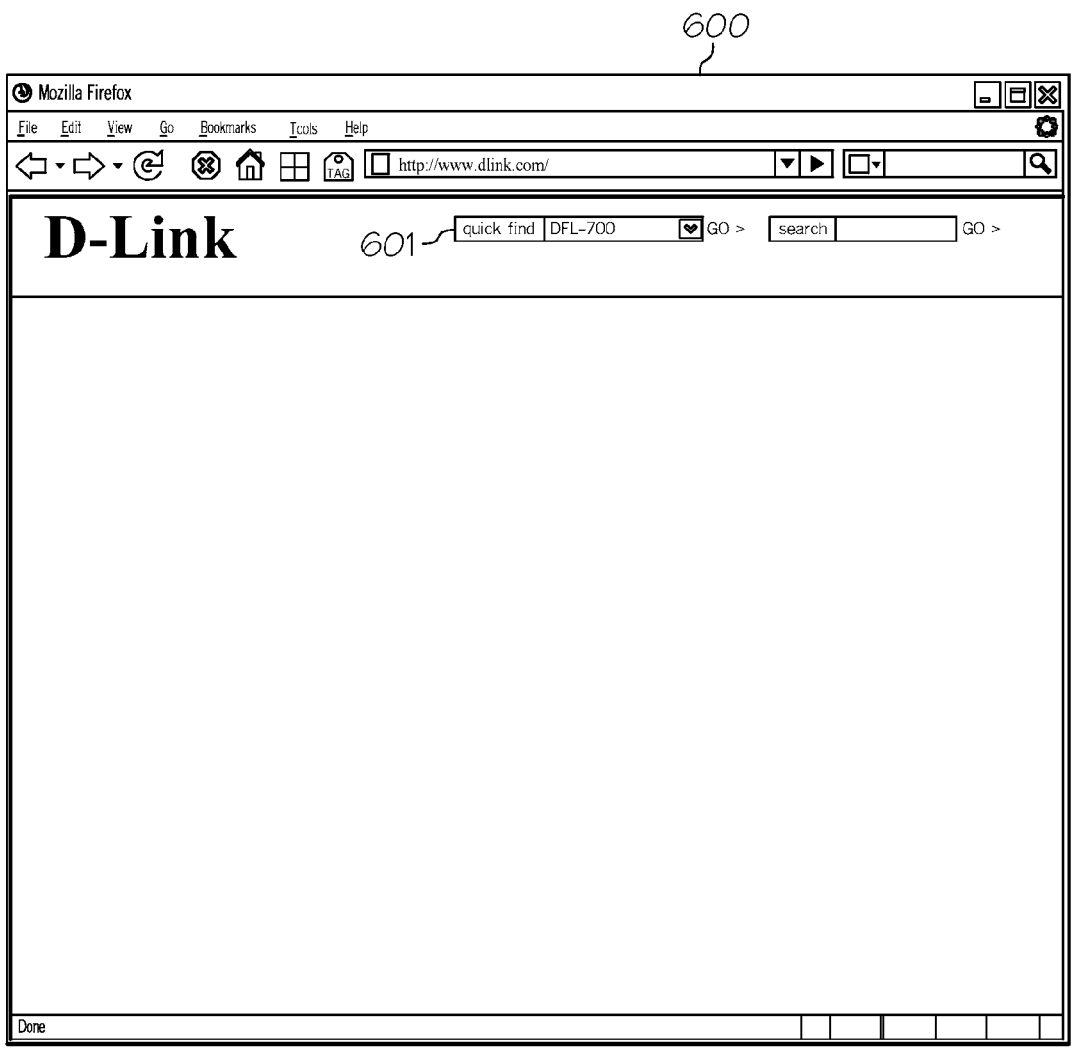
FIG. 6 is a screen image of a web browser interface illustrating an example rendering demonstrating the pre-selected option (from a drop down box) feature of the browser enhancement utility, according to an illustrative embodiment of the present invention.

Turning now to FIG. 6, there is illustrated a screen image of a web browser interface that provides an example rendering with the pre-selection feature of the browser enhancement utility, according to an embodiment of the present invention. Screen Image 600 comprises Pre-Select 601, which demonstrates the pre-selection of search terms. As provided, a search was executed with the search terms "DFL-700" (a product manufactured by D-Link). From the search results page, the operator then navigated to the home page for D-link. The enhanced browser window (with annotations) shows the DFL-700 pre-selected (within Pre-Select 601) in the drop-down box at the top of the page. Pre-Select 601 immediately draws the attention of the user to the selected items (DFL-700) allowing the user to quickly and efficiently navigate the web document. In one embodiment, Pre-Select 601 also provides the option of selecting other stored terms by clicking on the drop down arrow at the right of Pre-Select 601. Selection of this arrow triggers a display of additional terms, perhaps arranged in rank order, which can be selected in place of the pre-selected term. In this way, a search for one or more of the higher ranked terms stored in the datastore may be conducted within the result page.

Figure 7:
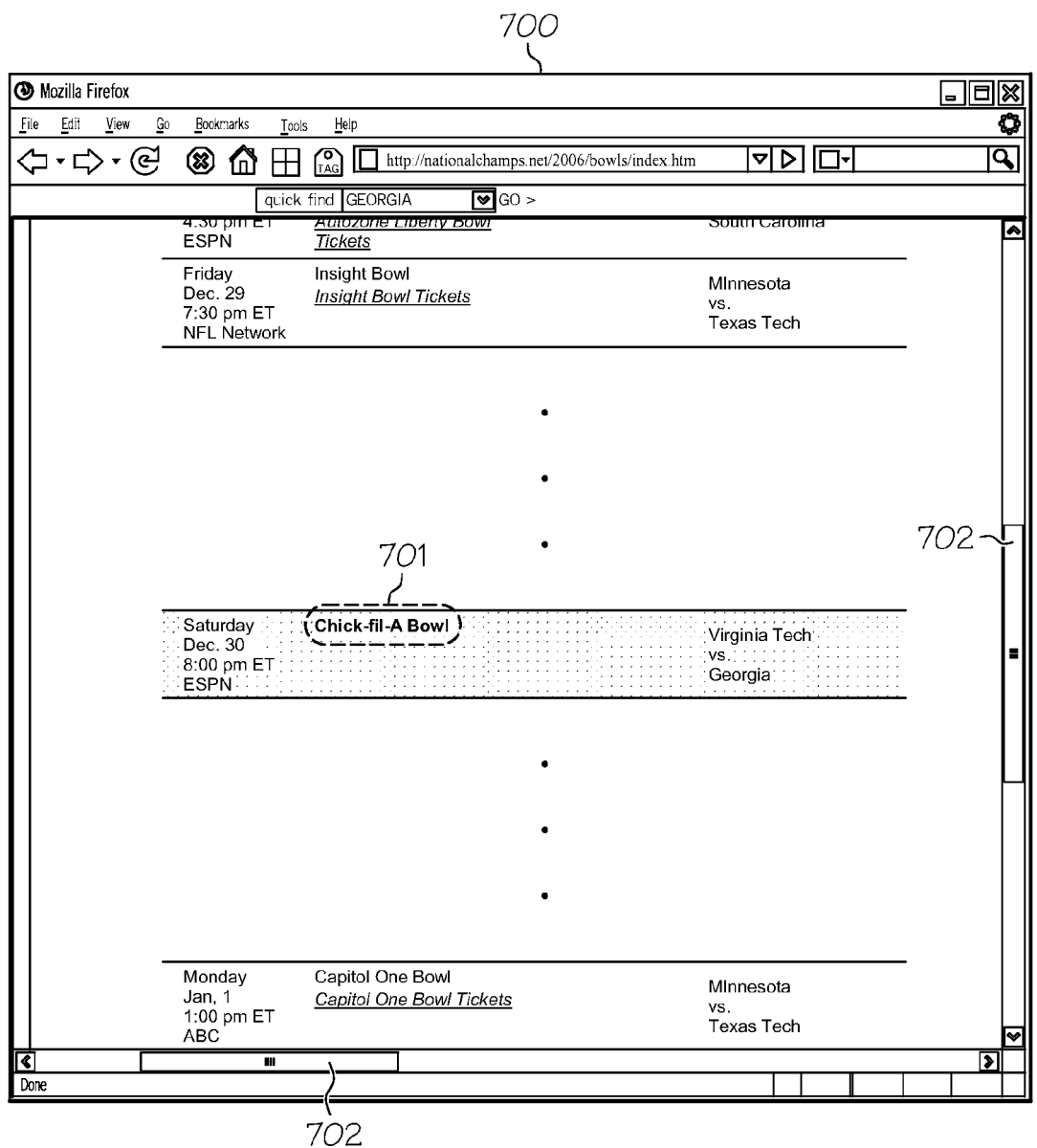
FIG. 7 is a screen image of a web browser interface illustrating an example rendering, demonstrating the highlighting and auto-focus features of the browser enhancement utility, according to an illustrative embodiment of the present invention.

FIG. 7 is a screen image of a web browser interface illustrating an example rendering, which demonstrates the highlighting and auto-focus features of the browser enhancement utility, according to an illustrative embodiment of the present invention. Screen Image 700 comprises Hi-Light portion 701, which is a highlighted group of search terms (of high ranking), and Auto-Focus pointer 702, which demonstrates the vertical (and/or horizontal) centering of these search terms (or content containing the selected high ranked, search term) on the display. With the specific illustration of FIG. 7, a search was executed with the search terms "Chick-Fil-A Bowl", representing a college football game. From the search results page, the operator then navigated to a bowl schedule page, on which the content including Chick-fil-A Bowl is automatically centered (and perhaps highlighted) within the page display. The Pre-Select (601) was then utilized to select GEORGIA, which may result in any reference to "Georgia" or any content that includes a match with the spelling of "Georgia" within the result page to be highlighted. The enhanced browser window (with annotations) demonstrates the benefits of highlighting (Hi-Light 701) and centering of the document using the auto-focus feature (demonstrated by the position of Auto-Focus pointer 702).

In the flow charts (FIG. 4 and FIG. 5) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While the present invention focuses on enhancements to web browsers, and uses this term extensively, it is recognized that the descriptions and enhancements provided could likewise be extended to any thin or thick client application which supports and enables "form fill" (text boxes, radio buttons, drop down boxes, etc.) activities.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

As described above, in one embodiment, the processes described by the present invention are performed by service provider server. Alternatively, the method described herein can be deployed as a process software from service provider server to a client computer. Still more particularly, process software for the method so described may be deployed to service provider server by another service provider server.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for analyzing recent behavior of search patterns in a data processing system, the method comprising:
a browser enhancement utility operating on the data processing system maintaining a history of search terms utilized to conduct searches, wherein the history is locally stored on the data processing system;
responsive to receipt of a search request having a search string that includes one or more search keywords, invoking a first search algorithm for retrieving search results that contain the one or more search keywords;
the browser enhancement utility invoking a second search algorithm for:
identifying, within the retrieved search results, matches of the one or more search keywords, and
matching one or more of the locally-stored search terms with the one or more search keywords; and
the browser enhancement utility presenting the returned page with an indication within the returned page of the presence of matches to both the one or more search keywords and the one or more locally-stored search terms.

2. The method of claim 1, further comprising:
ranking each of the one or more search terms that are matched within the returned page, said ranking based on an established ranking methodology that evaluates at least one of (a) a degree to which the one or more search terms matches corresponding terms within the returned page and (b) the proximity of the current search to the previous search involving a matching search term;
selecting only matching search terms that are of a high ranking as the one or more search terms to indicate within the result page.

3. The method of claim 2, further comprising:
generating a set of instructions with metadata entries which indicate a location, a type of metadata for rendering, and a ranking of the matching search terms within the returned page; and
transferring the set of instructions with the content of the returned page to a rendering engine for rendering of the returned page.

4. The method of claim 3, wherein:
when the type of metadata includes metadata to generate text-based highlighting, said presenting further comprises:
generating a display of the returned page having therein the one or more search keywords and the one or more of the stored search terms; and
highlighting, within the display of the returned page, the one or more search keywords and selected ones of the high ranking, matched search terms, wherein efficient locating of terms of current interest, identified via the search keywords, and terms of historical interest, via the matched search terms, is provided within the display of the returned page;
when the type of metadata includes metadata for providing pre-selected entries for radio and drop down pre-select, said presenting further comprising:
providing at least one drop down box and a radio button with selections of matched search terms that may be identified within the returned page;
pre-selecting a high ranked, matched search term for display within the drop down box;
displaying the pre-selected matched search term within the drop down box; and
enabling selection, utilizing the drop down box and radio button, of other matched search terms for identifying within the returned page; and
when the type of metadata includes metadata for auto-focusing the returned page, said presenting further comprises:
identifying a location of a match of a highest ranking matched search term within the returned page, wherein a highest ranking matched search term is one of the search keywords;
determining that the match occurred from a most recent entry in a current search and follow pattern thread; and
automatically adjusting a physical rendering of the returned page to substantially place the search term in a location of visible prominence relative to the overall physical space within which the returned page is being presented.

5. The method of claim 4, wherein said adjusting further comprises at least one of:
automatically focusing the returned page within the display such that relevant sections of text within which the search keywords and the historical terms are found are prominently placed within the viewable area of the display; and
when a next matched search term is selected within a drop down box, auto-focusing the returned page to prominently exhibit an area in which the next matched search term is located.

6. The method of claim 1, further comprising:
parsing a search string to remove insignificant terms contained within the search string with at least on significant search term, said search string utilized to conduct a search for objects that may be located using the at least one significant search term;

storing each significant search term within a datastore of stored search terms;

assigning a thread rank to each stored search term;

time-stamping each stored search term at a time of storage and subsequent update;

updating a time stamp of a stored term when the stored term is identified within a subsequent return page;

monitoring an elapsed time between an initial time of storage or subsequent update of the stored search term and a current time; and when the elapsed time exceeds a threshold expiration time without said stored search being identified within a returned page, automatically deleting the stored search term from storage.

7. The method of claim 1, further comprising:

tracking historical searches associated with the search terms across multiple browser instances, including searches from one or more of (a) other tabs, (b) other browser windows, and (c) alternate browsers during a search sequence associated with the historical search;

ranking search terms associated with each historical search relative to the current search based on a plurality of factors, including: (1) whether a previous search term is connected to other search terms via a same search thread, whereby search terms connected to the current search via a same search thread are provided a higher ranking than search terms not a part of the same search thread; and (2) proximity in time to the current search, whereby search terms associated with a more recent historical search are provided a higher ranking than search terms associated with a less recent search.

8. The method of claim 7, wherein said ranking further comprises:

determining a rank for each of a plurality of white space delimited character combinations of a returned page that matches with one of the search terms;

comparing the rank of each matched character combination with a pre-established threshold rank value;

initiating at least one of the following functions based on the rank of the matched character combination:

highlighting one or more of the plurality of white space delimited character combinations of the returned page when the particular matched character combination has a matching rank above the threshold rank value;

pre-selecting, from a radio button and a drop down box, one or more of a plurality of options corresponding to the matched character combination when the particular matched character combination has a highest matching rank; and auto-focusing a returned page to a section containing text corresponding to the matched character combinations with a highest rank.

9. The method of claim 1, further comprising:

determining whether the current search request is a constituent of a search and follow pattern that originated with a previous search, whose search terms are stored;

when the current search request is a constituent of a search and follow pattern that originated with a previous search with search terms:

initiating a first ranking algorithm to rank the search terms in descending order; and notifying a search history engine of an update to the search and follow pattern to now include the current search request and associated search keywords; and when the current search request is not a constituent of a search and follow pattern, initiating a second ranking algorithm, which includes:

(a) ranking each search starting at a most recent search, which is assigned a rank of "1", and incrementing a ranking by 1 for all previous searches not already ranked; and (b) notifying a search history engine of the initiation of a new search and follow branch originated by the current search request.

10. The method of claim 9, wherein the first ranking algorithm comprises:

(a) assigning a most recent (entire) search phrase a rank of "1";

(b) assigning each white space delimited character combination from the search phrase a rank of "2";

(c) incrementing the rank assignment with each step backwards in the search and follow pattern to a previous search; and (d) for a set of search terms not reachable by stepping backwards in the search and follow pattern, ranking each remaining search starting at the most recent remaining search, and incrementing the ranking by 1 for all previous searches not already ranked.

11. The method of claim 10, further comprising:

multiplying a rank of a search term by a preset constant, wherein, when the rank of one or more of the search terms is equal, each equal rank is multiplied by a same preset constant and when the rank of the one or more stored search terms is different, each different rank is multiplied by a different preset constant, wherein the preset constant is selected to favor more recently entered terms above less recent terms;

computing a closeness value between each one of a plurality of white space delimited character combinations within the returned page and each one of a plurality of search terms, which closeness value is computed based on relative rank order of the search terms, such that a closeness value of a highest ranking search term is first computed;

when the computed closeness value lies outside of a preset threshold range for acceptable closeness value, discarding an associated character combination as a match that is not relevant; and when the computed closeness value lies within a preset threshold range for acceptable closeness value:

adding the closeness value to the multiplied rank associated with a previous search term that was used in the closeness value computation to determine a matching rank for the white space delimited character combination; and storing the rank of the matched character combination in an ordered data structure.

12. The method of claim 9, wherein said determining further comprises:

detecting when a branching operation has taken place, wherein said branching operation is detected by one or more of: (a) opening a link in a new window; (b) opening a link in a new tab; and (c) clicking of a link that opens in a new tab or window;

detecting entry of the search request; and when a branching operation has taken place and entry of the search request is detected, adding the current and a most recent previous search to a search and follow branch/pattern.

13. A computer program product, residing on a computer readable storage medium, having a plurality of instructions embodied therein, the plurality of instructions, when processed by a processing device, allows a machine to perform the functions of:

maintaining, by a browser enhancement utility, a history of search terms utilized to conduct searches, wherein the history is locally stored on a data processing system;

responsive to receipt of a search request having a search string that includes one or more search keywords, invoking a first search algorithm to retrieve search results that contain the one or more search keywords;

invoking, by the browser enhancement utility, a second search algorithm to:
identify, within the retrieved search results, matches of the one or more search keywords, and
match one or more of the locally-stored search terms with the one or more search keywords; and presenting, via the browser enhancement utility the returned page with an indication within the returned page of the presence of matches to both the one or more search keywords and the one or more locally-stored search terms.

14. The computer program product of claim 13, the plurality of instructions further comprising instructions for:

ranking each of the one or more search terms that are matched within the returned page, said ranking based on an established ranking methodology that evaluates at least one of (a) a degree to which the one or more search terms matches corresponding terms within the returned page and (b) the proximity of the current search to the previous search involving a matching search term;

selecting only matching search terms that are of a high ranking as the one or more search terms to indicate within the result page.

15. The computer program product of claim 14, the plurality of instructions further comprising instructions for:

generating a set of instructions with metadata entries which indicate a location, a type of metadata for rendering, and a ranking of the matching search terms within the returned page;

transferring the set of instructions with the content of the returned page to a rendering engine for rendering of the returned page;

when the type of metadata includes metadata to generate text-based highlighting, said presenting further comprises:
generating a display of the returned page having therein the one or more search keywords and the one or more of the stored search terms; and
highlighting, within the display of the returned page, the one or more search keywords and selected ones of the high ranking, matched search terms, wherein efficient locating of terms of current interest, identified via the search keywords, and terms of historical interest, via the matched search terms, is provided within the display of the returned page;

when the type of metadata includes metadata for providing pre-selected entries for radio and drop down pre-select, said presenting further comprises:
providing at least one drop down box and a radio button with selections of matched search terms that may be identified within the returned page;
pre-select a high ranked, matched search term for display within the drop down box;
displaying the pre-selected matched search term within the drop down box; and
enabling selection, utilizing the drop down box and radio button, of other matched search terms for identifying within the returned page; and when the type of metadata includes metadata for auto-focusing the returned page, said present further comprises:
identifying a location of a match of a highest ranking matched search term within the returned page, wherein a highest ranking matched search term is one of the search keywords;
determining that the match occurred from a most recent entry in a current search and follow pattern thread; and
automatically adjusting a physical rendering of the returned page to substantially place the search term in a location of visible prominence relative to the overall physical space within which the returned page is being presented, wherein said adjusting further comprises at least one of:
automatically focusing the returned page within the display such that relevant sections of text within which the search keywords and the historical terms are found are prominently placed within the viewable area of the display; and
when a next matched search term is selected within a drop down box, auto-focusing the returned page to prominently exhibit an area in which the next matched search term is located.

16. The computer program product of claim 13, the plurality of instructions further comprising instruction for:

parsing a search string to remove insignificant terms contained within the search string with at least on significant search term, said search string utilized to conduct a search for objects that may be located using the at least one significant search term;

storing each significant search term within a data store of stored search terms;

assigning a thread rank to each stored search term;

time-stamping each stored search term at a time of storage and subsequent update;

updating a time stamp of a stored term when the stored term is identified within a subsequent return page;

monitoring an elapsed time between an initial time of storage or subsequent update of the stored search term and a current time; and when the elapsed time exceeds a threshold expiration time without said stored search being identified within a returned page, automatically deleting the stored search term from storage.

17. The computer program product of claim 13, the plurality of instructions further comprising instruction for:

tracking historical searches associated with the search terms across multiple browser instances, including searches from one or more of (a) other tabs, (b) other browser windows, and (c) alternate browsers during a search sequence associated with the historical search;

ranking search terms associated with each historical search relative to the current search based on a plurality of factors, including: (1) whether a previous search term is connected to other search terms via a same search thread, whereby search terms connected to the current search via a same search thread are provided a higher ranking than search terms not a part of the same search thread; and (2) proximity in time to the current search, whereby search terms associated with a more recent historical search are provided a higher ranking than search terms associated with a less recent search;

wherein said ranking further comprises:
determining a rank for each of a plurality of white space delimited character combinations of a returned page that matches with one of the search terms;
comparing the rank of each matched character combination with a pre-established threshold rank value;
initiating at least one of the following functions based on the rank of the matched character combination:
highlighting one or more of the plurality of white space delimited character combinations of the returned page when the particular matched character combination has a matching rank above the threshold rank value;
pre-selecting, from a radio button and a drop down box, one or more of a plurality of options corresponding to the matched character combination when the particular matched character combination has a highest matching rank; and
auto-focusing a returned page to a section containing text corresponding to the matched character combinations with a highest rank.

18. The computer program product of claim 14, the plurality of instructions further comprising instructions for:
determining whether the current search request is a constituent of a search and follow pattern that originated with a previous search, whose search terms are stored;
when the current search request is a constituent of a search and follow pattern that originated with a previous search with search terms:
initiating a first ranking algorithm to rank the search terms in descending order, wherein the first ranking algorithm comprises code for: (a) assigning a most recent (entire) search phrase a rank of "1"; (b) assigning each white space delimited character combination from the search phrase a rank of "2"; incrementing the rank assignment with each step backwards in the search and follow pattern to a previous search; and (d) for a set of search terms not reachable by stepping backwards in the search and follow pattern, ranking each remaining search starting at the most recent remaining search, and incrementing the ranking by 1 for all previous searches not already ranked; and
notifying a search history engine of an update to the search and follow pattern to now include the current search request and associated search keywords; and
when the current search request is not a constituent of a search and follow pattern, initiating a second ranking algorithm, which includes:
(a) ranking each search starting at a most recent search, which is assigned a rank of "1", and incrementing a ranking by 1 for all previous searches not already ranked; and
(b) notifying a search history engine of the initiation of a new search and follow branch originated by the current search request.

19. The computer program product of claim 18, the plurality of instructions further comprising instruction for:
multiplying a rank of a search term by a preset constant, wherein, when the rank of one or more of the search terms is equal, each equal rank is multiplied by a same preset constant and when the rank of the one or more stored search terms is different, each different rank is multiplied by a different preset constant, wherein the preset constant is selected to favor more recently entered terms above less recent terms;
computing a closeness value between each one of a plurality of white space delimited character combinations within the returned page and each one of a plurality of search terms, which closeness value is computed based on relative rank order of the search terms, such that a closeness value of a highest ranking search term is first computed;
when the computed closeness value lies outside of a preset threshold range for acceptable closeness value, discarding an associated character combination as a match that is not relevant; and
when the computed closeness value lies within a preset threshold range for acceptable closeness value:
adding the closeness value to the multiplied rank associated with a previous search term that was used in the closeness value computation to determine a matching rank for the white space delimited character combination; and
storing the rank of the matched character combination in an ordered data structure.

20. The computer program product of claim 18, the plurality of instructions further comprising instruction for:
detecting when a branching operation has taken place, wherein said branching operation is detected by one or more of: (a) opening a link in a new window; (b) opening a link in a new tab; and (c) clicking of a link that opens in a new tab or window;
detecting entry of the search request; and
when a branching operation has taken place and entry of the search request is detected, adding the current and a most recent previous search to a search and follow branch/pattern.

* * * * *